United States Patent [19]

Mohrman

[11] Patent Number: 5,039,407

[45] Date of Patent: Aug. 13, 1991

[54] WATER RECLAMATION AND COLLECTION UNIT

[76] Inventor: John H. Mohrman, Willow St., P. O. Box 280, Middleport, Pa. 17953

[21] Appl. No.: 471,491

[22] Filed: Jan. 29, 1990

[51] Int. Cl.[5] .............................................. B01D 36/02
[52] U.S. Cl. .................................. 210/195.1; 210/167; 210/202; 210/259; 210/919
[58] Field of Search ............... 210/121, 138, 161, 167, 210/195.1, 205, 206, 258, 259, 380.1, 402, 532.1, 919, 182, 202, 747; 405/52; 202/234, 235; 203/DIG. 1; 126/437, 448, 901; 137/566

[56] References Cited

U.S. PATENT DOCUMENTS

| | | | |
|---|---|---|---|
| 1,200,126 | 10/1916 | Mitchell | 210/205 |
| 1,922,442 | 8/1933 | Knight | 210/161 |
| 3,349,916 | 10/1967 | Magson | 210/161 |
| 3,497,062 | 2/1970 | Carlani | 210/747 |
| 4,017,395 | 4/1977 | Davis | 210/167 |
| 4,115,879 | 9/1978 | Toms | 210/138 |
| 4,145,279 | 3/1979 | Selby, III | 210/167 |
| 4,162,218 | 7/1979 | McCormick | 210/167 |
| 4,197,597 | 4/1980 | Toms | 210/138 |
| 4,359,789 | 11/1982 | Roberts | 210/167 |

FOREIGN PATENT DOCUMENTS

| | | | |
|---|---|---|---|
| 3147124 | 3/1983 | Fed. Rep. of Germany | 126/448 |
| 62-17568 | 1/1987 | Japan | 126/437 |
| 3319 | of 1874 | United Kingdom | 405/52 |

*Primary Examiner*—Robert A. Dawson
*Assistant Examiner*—Joseph W. Drodge

[57] ABSTRACT

The water reclamation and collection unit is designed to process water used for all purposes except, flushing toilets or fixtures used for depositing human waste, to a cleansed and sanitized condition that will allow such water to be used for any purpose within any facility inhabited by people. In addition this unit is designed to collect exterior moisture in any form from the atmosphere and process such moisture converted to water to a chemical state where it is potable for humans or animals. The total unit process is designed to provide sufficient water to allow persons in a facility to not have to use water from a well, public water distribution system or any other type surface water supply.

1 Claim, 6 Drawing Sheets

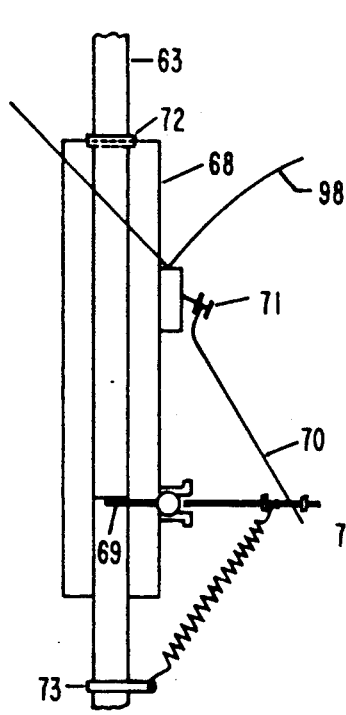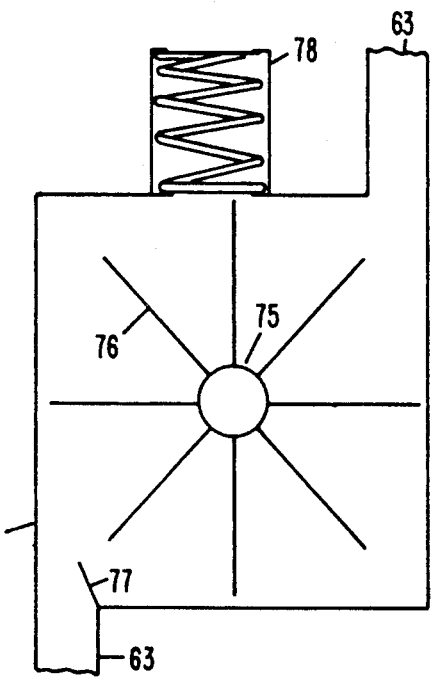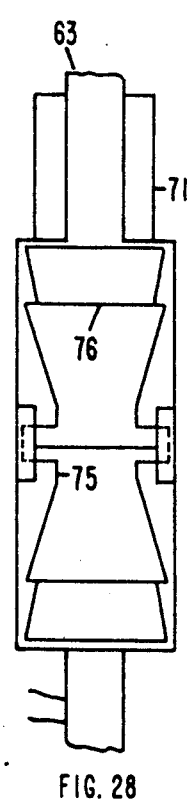
FIG. 26     FIG. 27     FIG. 28
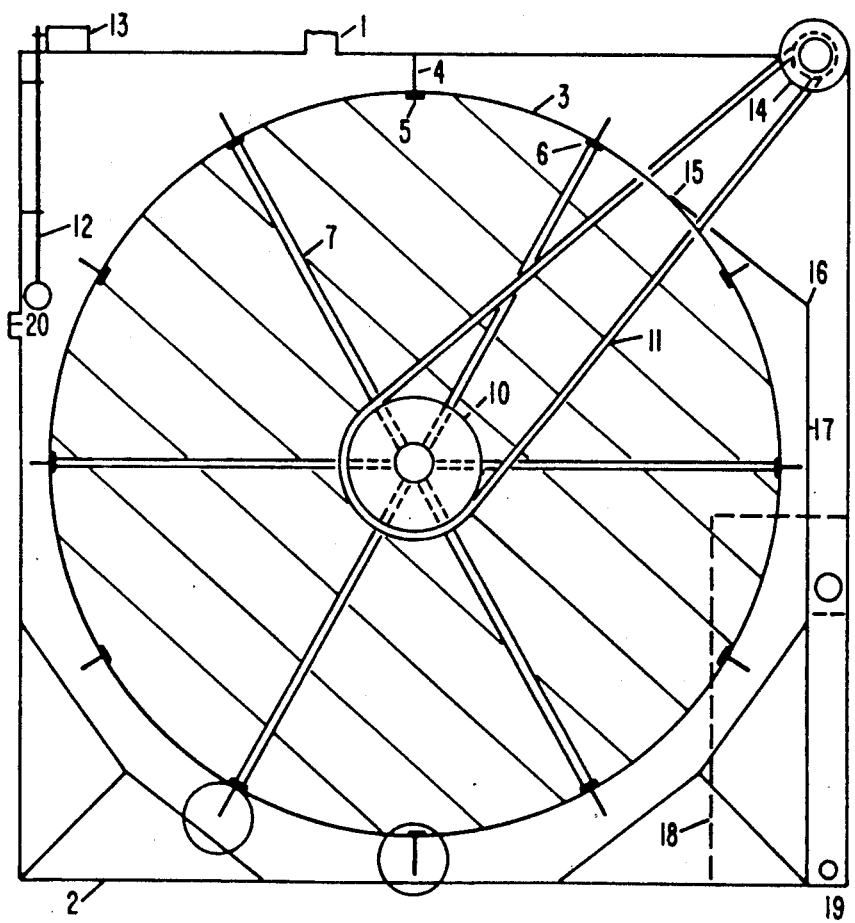
FIG. 4

WATER RECLAMATION AND COLLECTION UNIT

BACKGROUND OF THE INVENTION

1. Field of the Invention

This invention relates to two phases of water conservation and treatment. The first phase applies to processing and treatment of gray water—water used in all plumbing fixtures except toilets—to reclaim that water for use in flushing toilets, lavatories, baths and showers, clothes washers and similar items where clear, potable water is required. The second phase is to collect water from rain or snow-falls and treat such water to make it potable for human consumption. More particularly, the invention relates to a complete system for cleansing and purifying water that has been used and for purifying water collected from the atmosphere so that both the used and collected water can be repeatedly used for appropriate purposes.

2. Brief Description of the Prior Art

Social concern for the manner in which all forms of private and public supplied water is provided to all users in an untreated or only partially treated condition has intensified in recent times as concern for the contamination and pollution of man's environment has deepened. It is common knowledge that acid rain developed by natural rain passing through man's generated smog has vastly contributed to water pollution. Moreover, the continuing loss of the earth's natural ability to aquify ground water and the continuing infiltration of sea water in some coastal areas contributes to this great social concern. Heavily populated areas are reaching the point at present that sufficient water cannot be supplied to meet the wanton usage and governmental agencies at all levels are unsuccessfully attempting to restrict such use. Civilization cannot exist without clean water. The health and welfare of our civilization in the immediate future is directly dependent on resorting to use of new technology such as is contained in this invention.

The problem of water contamination and pollution on the earth will continue as long as new complete technology to provide an economical system to allow individual entities to control the quality of the water they need is not available. Illustrative of efforts which have been made to attempt to provide limited resolution of the general application of water purification and reclamation needed are the systems described in U.S. Pat. No. 4,115,879 and 4,197,597 to Toms, in U.S. Pat. No. 4,359,789 to Roberts, in U.S. Pat. No. 4,163,218 to McCormick, U.S. Pat. No. 4,017,395 to Davis, in U.S. Pat. No. 4,145,279 to Selby, the 3rd, in U.S. Pat. No. 3,349,916 to Magson, in U.S. Pat. No. 1,922,442 to Knight, in U.S. Pat. No. 1,200,126 to Mitchell, in Japan Pat. No. 6,217,568, in German Pat. No. 3,147,124 and in British Pat. Ref. No. 3,319 may be mentioned. The Toms system described in U.S. Pat. No. 4,115,879 and 4,197,597 constitutes the culmination of an effort extending over several years by Toms to use apparatus for reclaiming gray water and collecting rain water. In the most recent Patent issued to Toms the means for removal of solids from gray water and for positive filtration of such water appear to be decidedly lacking in the capability to process unlimited quantates while still maintaining a strict standard of purity.

In Selby the 3rd U.S. Pat. No. 4,145,279, the mechanisms are theoretically similar to this invention but lack the capability to produce a potable product from the water sources specified in this invention.

All other Patents and references cited hereinabove claim to perform limited processing of either gray water or water collected from the atmosphere. In addition, the application of low PH water or other means to cause coagulation of detergents, greases and similar chemicals to insure that the gray water can be filtered to the maximum extent does not appear to be considered in any of the above references.

Finally, the referenced Patents cited above do not appear to consider ease of manufacture and installation. It is apparent that no complete system to extensively and thoroughly reclaim used water and collect atmospheric water and treat such water to be fully potable has been Patented to the present.

BACKGROUND OF THE INVENTION

The present invention provides an apparatus or system for efficiently cleansing and sanitizing used or gray water emanating from all plumbing fixtures except those used for human or animal waste and for water that is collected from the atmosphere in pans mounted on the exterior of a building or facility. Broadly described, the invention comprises direction of the gray water into a Solid Substance Extractor where through a cylindrical combing action powered by an electric motor which is activated by a water level ball-float switch, said Solid Substance Extractor removes debris and most solids from the inflowing used water and deposits said solids in a drainage compartment wherein the solids are removed by a common drain receptacle. As used water continues to flow into the Solid Substance Extractor and is processed as described hereinabove, the partially cleansed water overflows from the Solid Substance Extractor into an electric motor propelled Centrifugal Rotation Drum Filter. Water enters this assembly through a circular pipe diffuser containing a multiplicity of holes to direct the incoming water down onto the filter assembly in a washing motion. The water in the Centrifugal Rotation Drum Filter is mixed with a preset amount of low PH liquid causing grease, detergents and other chemical agents in the used water to coagulate and form particles. In continuation of the rotating action of the filter assembly, a plurality of paddles attached to the center shaft of that assembly forces the water bearing particles into and against a circular fabric filter section held in place by a wire basket filter retainer. Said water borne particles lodge on the aforementioned circular filter material and the cleansed water exits the filter. As the liquid level lowers in the Centrifugal Rotation Drum Filter assembly the rotation of the inner filtering assembly is stopped thereby allowing the particles washed downward to enter a common drain through a valve arrangement that opens when the rotating action ceases. During the filtering process water cleansed to the point that some minor sediment remains flows from the Centrifugal Rotation Drum Filter into a compartmentalized Sediment Removal Tank. The compartmented sections of said assembly allow the water to flow downward from a multiplicity of higher partitioned sections to adjacent lower partitioned sections. As the water flows from one section of the Sediment Removal Tank to the next consecutive section, sediment gravitates to the bottom of the tank sections and is periodically drawn off into a common drain line by use of a manual operated valve. The lowest and last section of said Tank contains a common sump pump. As the rising water level activates the pump by a ball-float switch, the cleansed water is pumped up into a series of Evaporative-Condenser-Collector Receptacles mounted on the exterior of the facility at a pitch of not more than 5 degrees from pan top to bottom. The water enters closed compartmentalized Receptacle sections containing ambient temperature heat which flows through an insulated duct from the facility or building below combined with solar heat sufficient to cause evaporation of said water being pumped into the compartments. As the evaporative process takes place, said evaporated water collects on the top of each compartment and on condenser plates and returns to liquid form leaving any remaining foreign residue to flow back down into the Sediment Removal Tank. The condensed water in turn gravitates through piping first through a spring loaded water-weight activated switch which in turn activates a chemical feeder to set the PH value of the water at acceptable limits. Again the water gravitates into an Aeration Chamber to be properly aerated and then continues to gravitate as clean potable water into appropriate storage tank(s) where through use of automatic electric valving and shallow well pump(s) the water is pressurized for normal use. As the pressurized water is drawn from pressurized tank(s), it passes through an activated charcoal filter to remove any odor or chlorine taste. Automatic electric valving is activated as storage tanks become filled to capacity to cause the gray water to bypass the Solid Substance Extractor and flow through a Solids Separating Chamber through hereinabove said common drain into a holding tank for future use.

Processing water collected from the atmosphere by the open pan sections of the Evaporative-Condenser-Collector Receptacles gravitates through piping into a spring loaded water-weight activated switch which in turn activates a chemical feeder to set the PH value of the water at acceptable limits. Continuing to gravitate, the water passes through an Aeration Chamber wherein the water is aerated and proceeds into storage tank(s). The water is pressurized by a series of automatic electric valving and shallow well pump(s) and is drawn through an activated charcoal filter for use. As said storage tanks become filled, incoming water collected from the atmosphere is stopped through automatic electric valving and the water overflows from the collecting pan sections of the Evaporative-Condenser-Collector Receptacles.

From the foregoing general description of the invention, it will become apparent that it is an important object of the present invention to provide a complete apparatus or system to Reclaim and Collect water to control the quantity and quality of water consumed.

Another object of the invention is to provide a system of reusing water by cleansing and sanitizing same to reduce consumption of water from natural sources and to provide supplemental supplies of water collected from the atmosphere.

Another object of the invention is to introduce a low PH liquid into the gray water being processed to cause coagulation of most chemical additives and increase the efficiency of filtration of the water to increase the degree of cleanliness and sanitizing attained.

Another object of the invention is to provide a vaporizing and condensing means to absolutely purify used water.

A further object of the invention is to provide a means of collecting water from the atmosphere that can be chemically treated, aerated, stored and filtered before use of said water.

Additional objects and advantages of the invention will become apparent as the following detailed description of a preferred embodiment of the invention is read in conjunction with the accompanying drawings which illustrate the invention.

BRIEF DESCRIPTION OF THE DRAWINGS

FIGS. 4, 5, 6 and 7 are detailed views of the Solid Waste Extractor utilized in the present invention and showing portions of the component in section.

FIG. 26 is a sectional view of spring loaded water-weight activated switch utilized in the present invention.

FIGS. 27 and 28 are front and side sectional views of the Aeration Chamber utilized in the present invention.

DETAILED DESCRIPTION OF THE PREFERRED EMBODIMENT OF THE INVENTION

Figure 3:
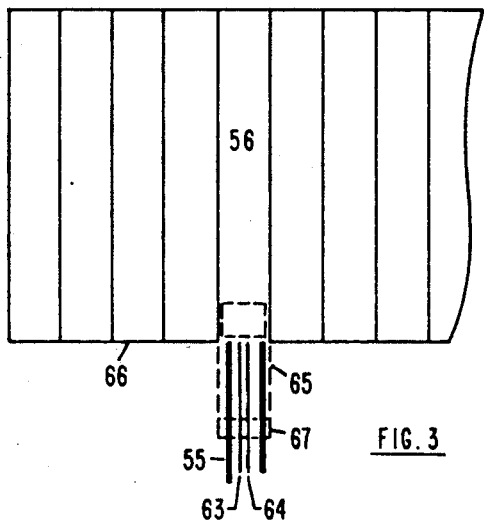
FIGS. 1, 2 and 3 comprise a consolidated flow diagram depicting, in general form, the various elements of the system or apparatus employed in the present invention and the method by which these elements are employed in sequence for processing of used gray and atmospheric collected water to a clean and potable condition.
Figure 2:
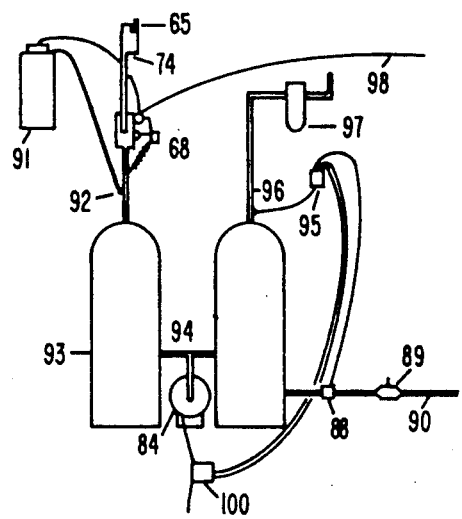
Figure 1:
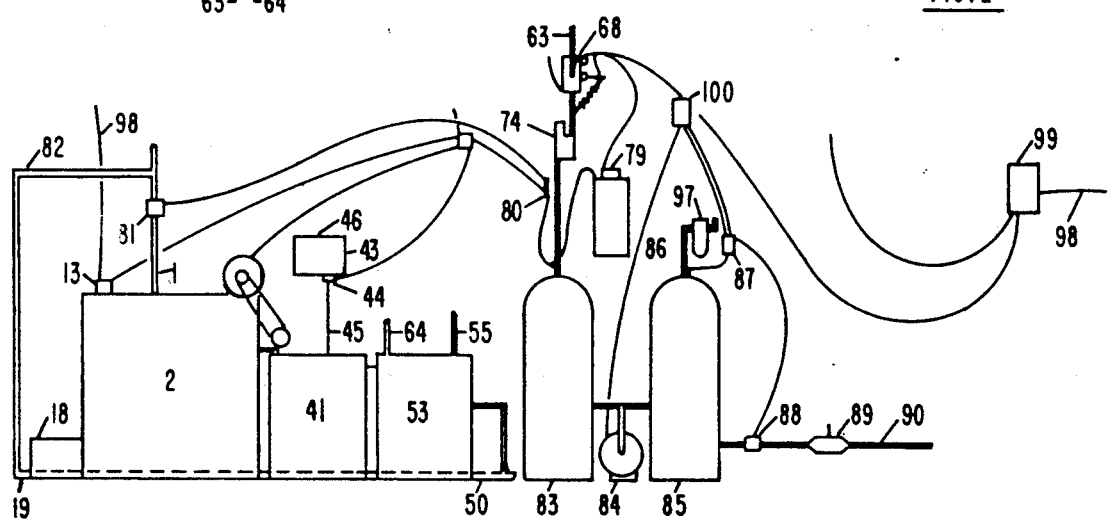
Figure 25:
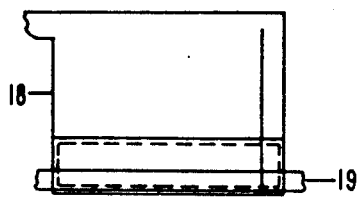
FIG. 25 is a detailed view a Solids Seperating Chamber utilized in the present invention shown in section.

Referring initially to FIGS. 1, 2 and 3 of the drawings, the system of the present invention is shown in sequence of employment of the elements of that system. There is thus shown a gray water inlet line 1 into 2 which is the Solid Waste Extractor.

Figure 5:
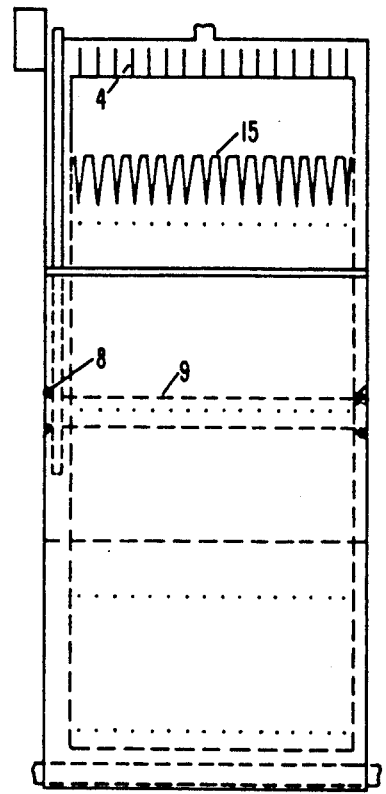

The Solid Waste Extractor 2 is shown in greater detail in FIGS. 4, 5, 6 and 7. FIG. 4 shows a cylindrical drum 3 equipped with a multiplicity of tempered wire fingers 4 attached to the drum in 5 and 6 represented by blown up circles shown in FIG. 4 and in FIGS. 6 and 7. Continuing with FIG. 4 said drum is braced by supports 7 attached to the axle of the drum, while FIG. 5 shows said axle 9 turning in roller bearings 8 attached to the housing 2 as shown in FIG. 4. The drum is propelled by a chain driven sprocket 10 on the drum axle and a circular chain 11 powered by an electric motor equipped with a chain sprocket drive 14. The electric motor is activated by rod and ball-float 12 as water level rises and turns switch 13 on. As the drum rotates straining solid waste from the incoming water, strained waste on the wire fingers 4 is removed from the fingers as they pass through combing plate 15 in FIG. 5. FIG. 4 shows a hinged combing plate 16, a compartment for gravitating combed waste 17, a compartment to store the waste 18 and a common drain to remove waste 19. Still referring to FIG. 4 the overflow 20 allows the strained water to leave the Solid Waste Extractor and enters the Centrifugal Rotation Drum Filter 41 shown in FIG. 1.

Figure 10:
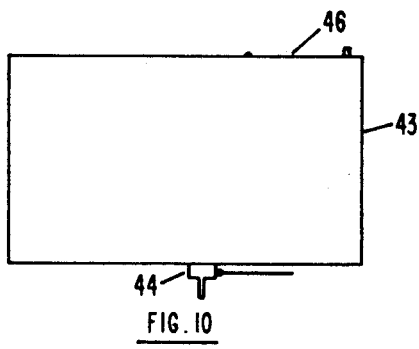
FIGS. 8, 9 and 10 are detailed views of the Centrifugal Rotation Drum Filter utilized in the present invention, and showing portions of the component in section.
Figure 8:
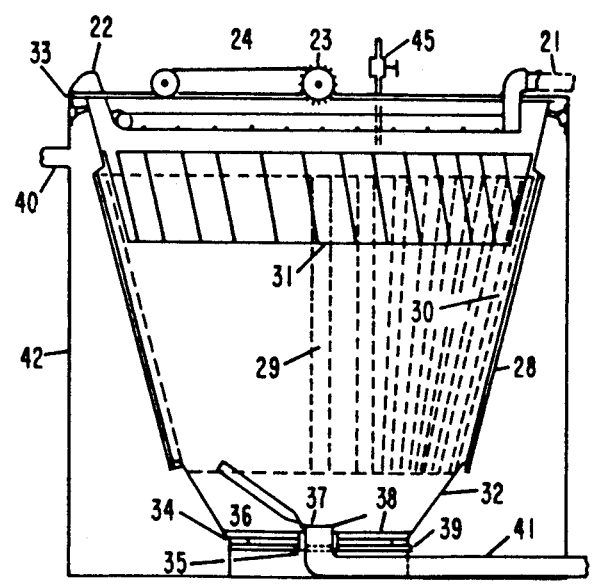
Figure 9:
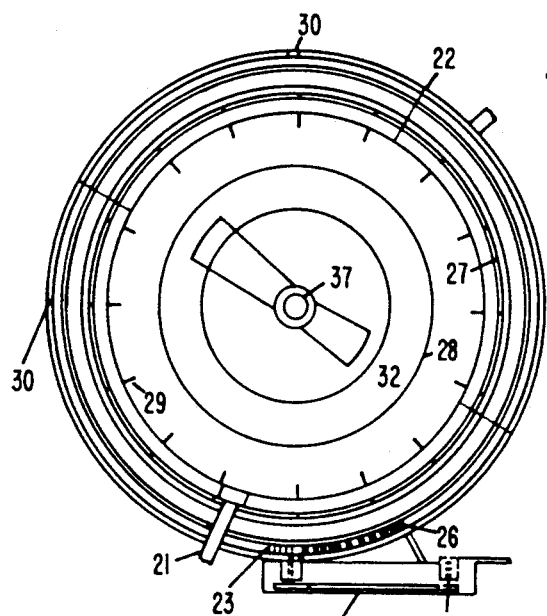

The Centrifugal Rotation Drum Filter 41 is shown in greater detail in FIGS. 8, 9 and 10. Referring to FIG. 8, incoming strained water enters 21 that is a circular pipe diffuser with a multiplicity of holes to allow the water to gravitate onto the filter element 30. The entire circular section of 21 is hinged before it enters the component, to allow the entire section to be raised for work to be performed within the drum. 21 is equipped with three curved supports 22 which rest on the stationary part of the apparatus. 23 is a sprocket drive propelled by a V-belt 24 from the drive pulley 25 as shown in FIG. 9. Again referring to FIG. 9 the top edge of the circular rotating drum contains a track of spaced square slots 26 to receive sprocket 23. 27 is the top edge of the rotating drum, 28 illustrates the spaced support slats connected between the top and bottom of the rotating drum. In FIG. 8, 29 is a flexible grid that retains 30 the gauze type replaceable filter which hooks to the retainer grid. The removable fins 31 causes an outward swirling action as the revolving drum rotates. The bottom section of the drum 32 is connected to the spaced support slats and to the base 38 of the rotating drum. The top edge of the rotating drum is supported and rides on four rollers 33, the bottom section or base rests on and rotates on four rollers 34 mounted on the stationary base 39. 35 shows a circular washer installed around the drain piping 41 at the stationary base 39, bushing 36 is attached to drain pipe 41 and is the axis for the rotating drum. 37 is a cap type valve with an angular vane and a flat vane. The angular vane holds the valve closed when the rotating drum is in motion. When the motion stops the weight of the flat vane causes the valve to open to allow filtered waste to enter the drain 41. 42 is the assembly circular housing containing a top cover. The low PH liquid tank shown in FIG. 10 as 43 contains a solenoid valve 44 which opens when the Centrifugal Rotation Drum Filter is activated, 46 is a hinged lid on top of the tank to service the container and 45 in FIG. 8 is a manual control valve to regulate the flow of liquid from the tank.

Figure 11:
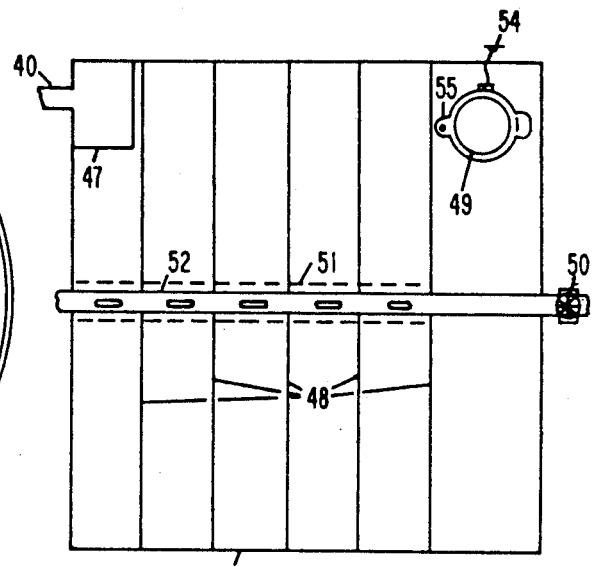
FIGS. 11, 12 and 13 are detailed views of the Sediment Removal Tank utilized in the present invention and showing portions of the component in section.
Figure 13:
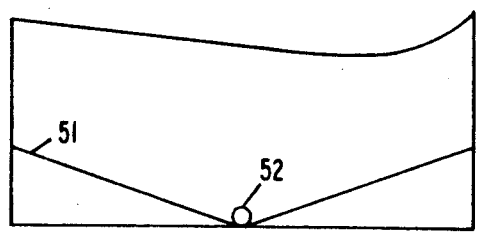
Figure 12:
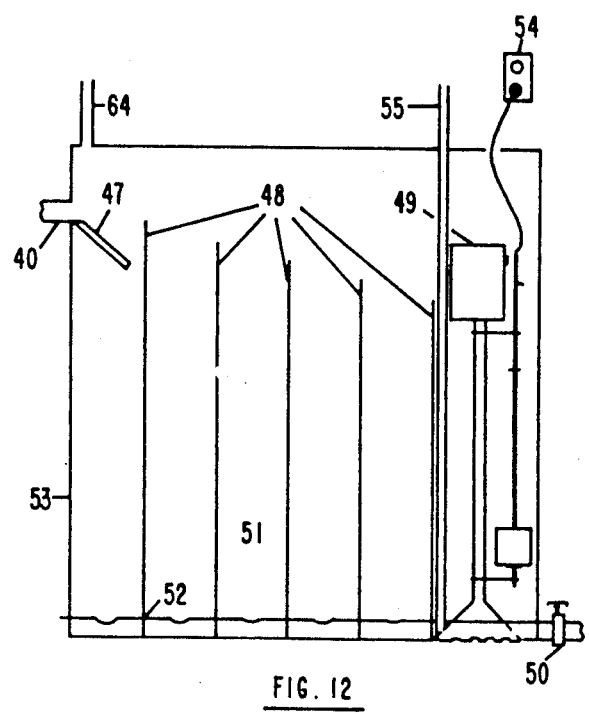

The Sediment Removal Tank shown as 53 in FIG. 1 is shown in greater detail in FIGS. 11, 12 and 13. FIG. 11 shows 40 as piping to receive the strained and filtered water from the Centrifugal Rotation Drum Filter shown as 41 on FIG. 1. 47 is a splash plate spreading the incoming flow of water to prevent the sediment from being stirred that is already in the tank. In FIGS. 11 and 12, 48 shows the partitions compartmentalizing the tank, 49 shows the sump pump, 50 is the sediment flow control valve, 51 is the slanted tank bottom as shown in FIG. 13, 52 is the common sediment drain pipe. Again referring to FIGS. 11 and 12, 53 is the tank housing, 54 is the electrical outlet for sump pump 49, 55 is the outlet piping to the Evaporative-Condenser-Collector Receptacles and 64 is the inlet piping from that exterior assembly.

Figure 14:
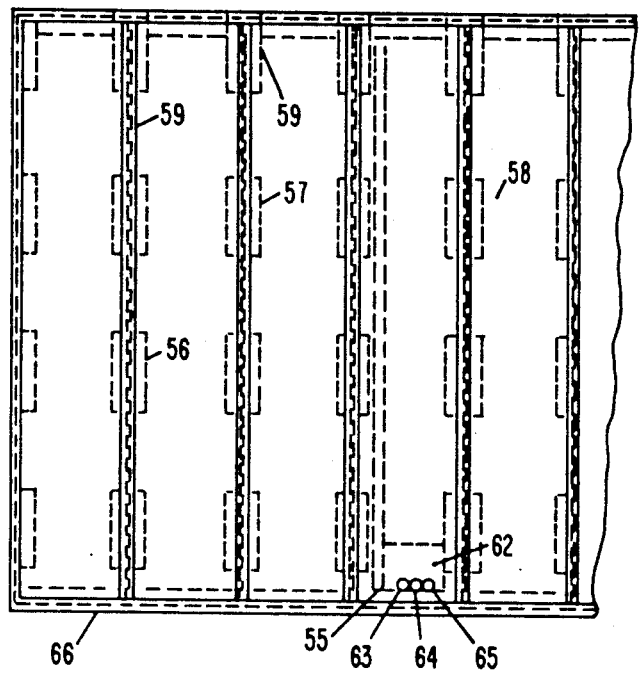
FIG. 14 is a detailed view of a plurality of Evaporative-Condenser-Collector Receptacles utilized in the present invention and showing portions of the component in section.
Figure 15:
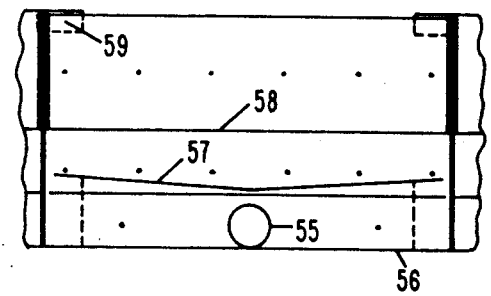
FIGS. 15, 16, 17 and 18 are detailed sectional views of a single Evaporative-Condenser-Collector Receptacle utilized in the present invention.
Figure 16:
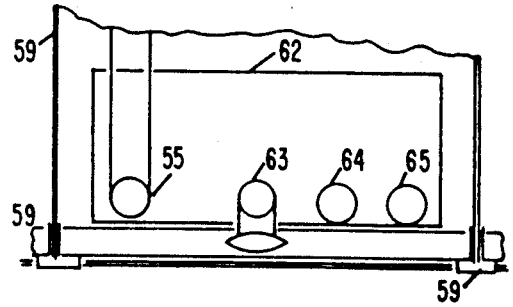
Figure 17:
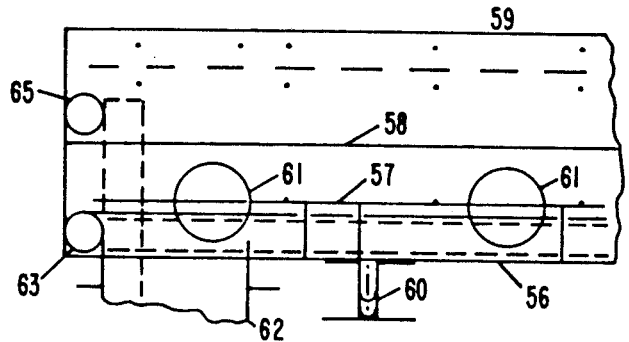
Figure 18:
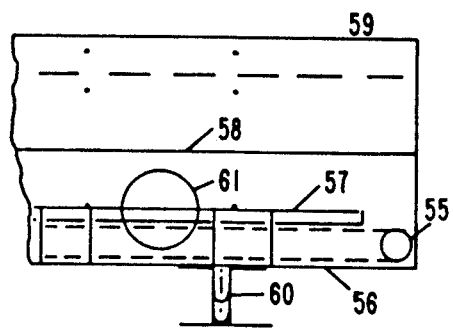
Figure 19:
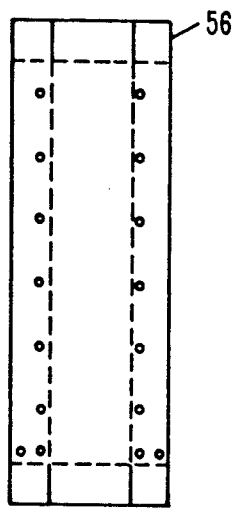
FIGS. 19, 20, 21, 22, 23 and 24 are detailed views of parts to construct a single Evaporative-Condenser-Collector Receptacle component utilized in the present invention.
Figure 20:
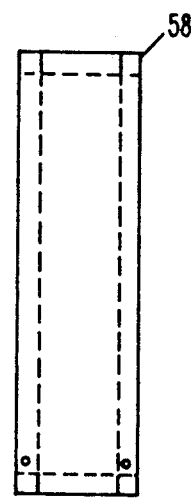
Figure 21:
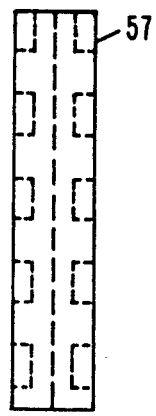
Figure 22:
Figure 23:
Figure 24:
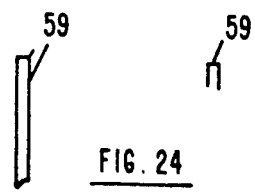
Figure 30:
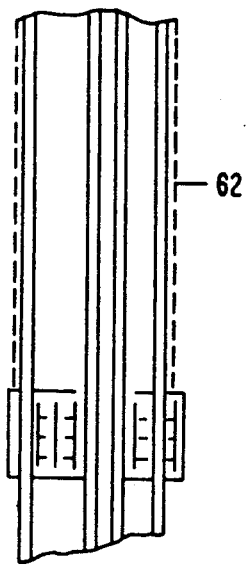
FIGS. 30 and 31 are detailed sectional views of the ducting utilized in the present invention.
Figure 31:
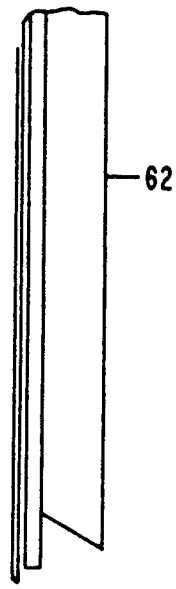

FIG. 2 shows an apparatus in duplication of that shown in FIG. 1 for the sole purpose of differentiation between the apparatus for processing gray water and that only required for processing collected atmospheric water. Water condensed from gray water and the collected water can be transmitted together by combining piping 63 in FIG. 1 and 65 in FIG. 2, at a point after they leave the Evaporative-Condenser-Collector Receptacles without duplication of apparatus for final processing. Therefore, description of the apparatus contained in FIG. 1 for final processing of condensed processed gray water is identical to the use of the apparatus shown in FIG. 2. Referring to FIG. 3, 56 is shown as a multiplicity of Evaporative-Condenser-Collector Receptacles 66, shown in greater detail in FIGS. 14 through 24 inclusive. FIG. 14, shows the inlet 55 piping which transmits water from the sump pump 49 in FIG. 12 to the upper end of the interconnected Receptacles allowing the water to enter the closed portion through a multiplicity of holes in the horizontal piping passing through and into each Receptacle. 64 piping collects and returns water that has not evaporated to the Sediment Removal Tank 53, 63 and 65 piping return the condensed and collected water to apparatus for further processing. Again referring to FIG. 14, 62 shows the entrance of the ducting from the building or facility below as shown in detail in FIGS. 30 and 31. 56 shows construction details of the housing of each receptacle also in FIG. 19, 57 shows the detail reflected in FIG. 21 of the condenser collecting plate, 58 is the collecting pan shown in FIG. 20 for atmospheric water and 59 shown in FIGS. 22, 23 and 24 are parts to waterproof Collector seams, to connect and waterproof a multiplicity of Collectors. 60 represents adjustable support legs for the Collectors for mounting on an exterior surface, 61 are multiple openings between Collectors to allow vaporized air to circulate, 55, 62, 63, 64 and 65 are described hereinabove as shown in FIGS. 15, 16, 17, and 18.

Again referring to FIGS. 1, 2 and 3, as water leaves the Evaporative-Condenser-Collector Receptacles 56 by piping 63 or 65 and enters the Aeration Chamber 74 shown in FIGS. 27 and 28, 75 the paddle wheel shaft is caused to rotate by water falling on the paddles 76, 77 is a baffle plate which partially deflects water from the chamber outlet, 78 allows air to enter the chamber as a slight vacuum is caused by the paddle wheel rotation.

Figure 29:
FIG. 29 is a detailed view of a solenoid valve utilized in the present invention.
Figure 6:
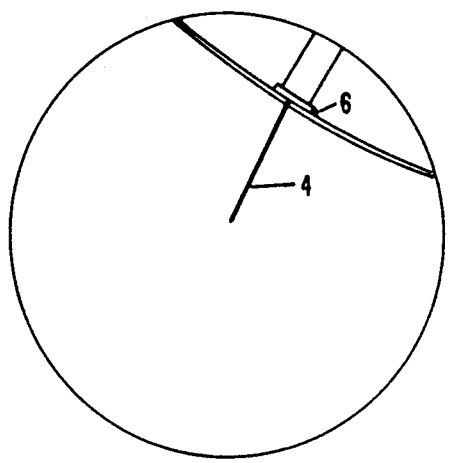
Figure 7:
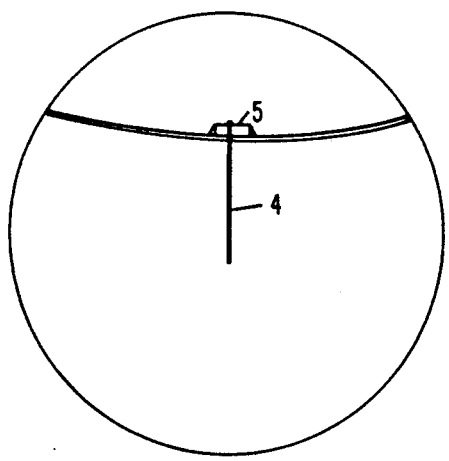

Water gravitating from the Aeration Chamber 74 enters the spring loaded water-weight mechanism 68 shown in FIG. 26, and causes valve 69 to open and with linkage 70 turns on switch 71 which activates chemical feeder 79 or 91 to regulate the PH level of the water. 72 is a gasket seal between the inlet pipe 63 or 65 and the chamber 68, 73 is a pipe ring clamp and spring to adjust tension on 69. The water then enters storage tank(s) 83 or 93 and if the tank is full solenoid valves 80 or 92 stop the incoming water. The gray water is diverted at 81 and by-passes through 18 as described hereinabove and the collected water overflows the exterior collecting pans. Shallow well pump 84 is activated as pressure drops below a preset level in tank(s) 85 or 94, if insufficient storage was not available and water could not be drawn from the pressurized tanks, solenoid valves 88 shown as FIG. 29, would allow water to enter through a pressure regulating valve 89 from an outside source 90. Water drawn through piping 86 or 96 passes through filter 97. Electric power to activate all mechanisms is line 98, service panel is 99 and junction box is 100.

Other changes and innovations of structure and mode of usage will occur to those skilled in the art after having become cognizant of the basic principles which underlie the present invention and it is considered that changes and modifications which continue to rely upon these basic principles are within the spirit and scope of the invention, except as the same may be necessarily limited by the appended claims or reasonable equivalents thereof.

What is claimed is:

1. A water reclamation and collection unit comprising in combination:

means to extract solid waste from and to purify gray water emanating from plumbing fixtures of a building or facility;

means to collect rain water falling on said building or facility, said means to collect being located on said building or facility;

means to combine said purified gray water and said collected rain water into a combined water supply and;

means to further purify said combined water supply to provide potable water.

* * * * *